(No Model.)
J. H. BEEBEE.
FLEXIBLE SHAFTING AND HANGER THEREFOR.
No. 475,104. Patented May 17, 1892.
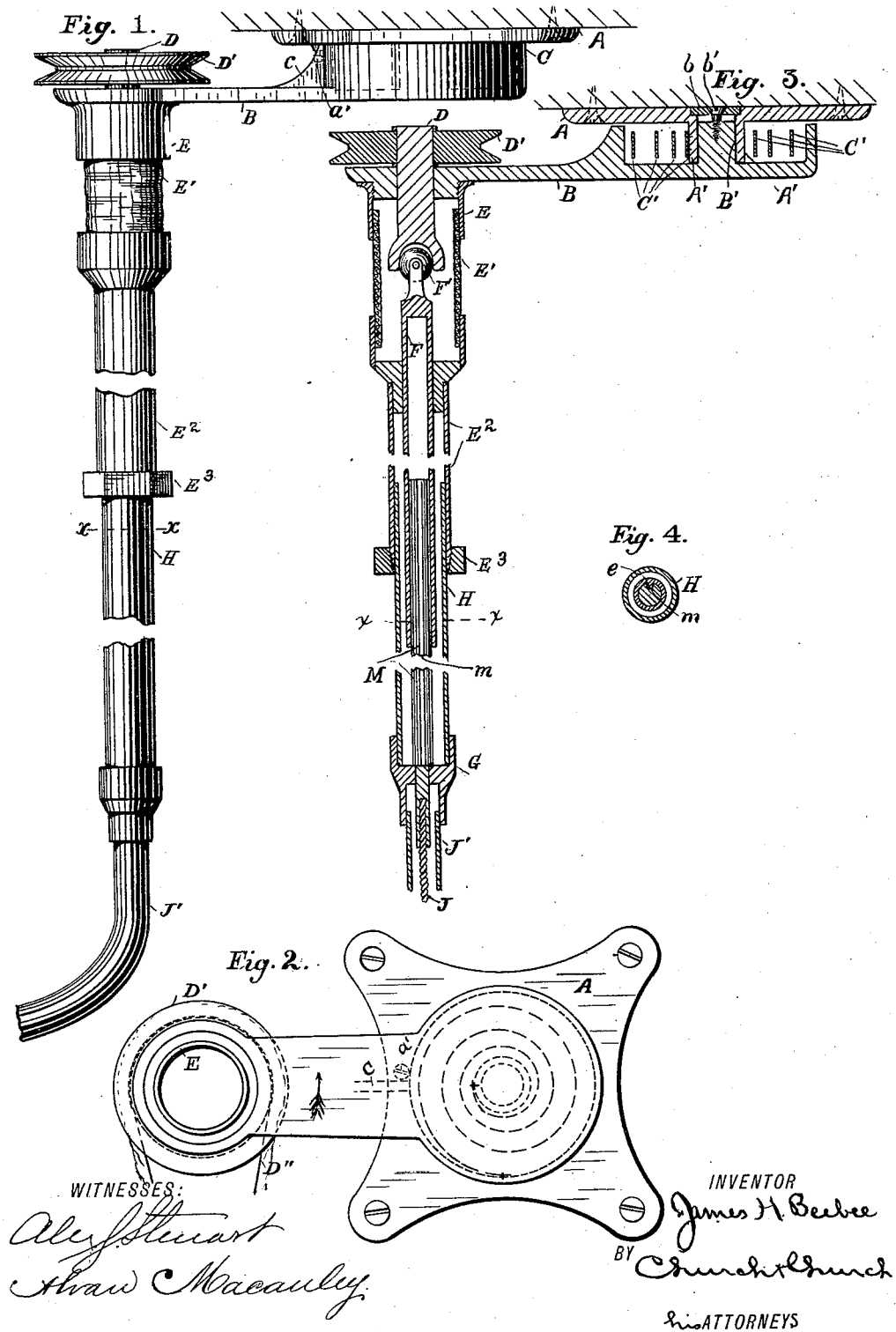

UNITED STATES PATENT OFFICE.

JAMES H. BEEBEE, OF ROCHESTER, NEW YORK.

FLEXIBLE SHAFTING AND HANGER THEREFOR.

SPECIFICATION forming part of Letters Patent No. 475,104, dated May 17, 1892.

Application filed August 3, 1891. Serial No. 401,568. (No model.)

*To all whom it may concern:*

Be it known that I, JAMES H. BEEBEE, of Rochester, in the county of Monroe and State of New York, have invented certain new and useful Improvements in Flexible Shafting and Hangers Therefor; and I do hereby declare the following to be a full, clear, and exact description of the same, reference being had to the accompanying drawings, forming a part of this specification, and to the letters of reference marked thereon.

The object of my present invention is to provide an adjustable shaft for operating tools—such as dentists'—guided by hand, and also an improved device for supporting such shaft and operating as a belt-tightener therefor; and to these ends it consists in certain novelties of construction and combinations of parts, all as will be hereinafter described, and the novel features pointed out particularly in the claims at the end of this specification.

In the drawings, Figure 1 is a side view of my shaft and hanger depending from the ceiling; Fig. 2, a plan view of the same looking upward; Fig. 3, a longitudinal sectional view; Fig. 4, a section on the line $xx$ of Fig. 1.

Similar letters of reference in the several figures indicate similar parts.

The hanger or support for the shaft is provided with a base-casting A, adapted to be secured to the ceiling or other elevated support over the operating-chair, if the device is to be used by a dentist, and is provided in its lower face with a boss A'.

B indicates the shaft-carrying arm, provided at one with a stud B', entering the boss A' and held by a washer $b$ and screw $b'$, though permitted to turn freely in the boss. Formed with or secured to this arm is a drum or casing C, having a rib or lug $c$ thereon, and inside the casing is located a volute spring C', connected at one end to boss A' and at the other to the casing, or, if desired, to a projection on the arm, the casing being then dispensed with. This spring tends to move the arm B in the direction of the arrow, Fig. 2, and excessive movement is prevented by a small screw $a'$ on the base, with which the lug $c$ is adapted to engage.

The outer end of the arm B constitutes a bearing for a short shaft D, to which the pulley D' is secured, and around this pulley extends a driving-belt $D^2$, the parts thus far being so arranged that the spring will move the arm and pulley in a direction to maintain an even tension on the belt at all times and insure the proper rotation of the pulley. Also secured to the outer end of the arm B and surrounding the shaft D is a rigid sleeve E, connected by a flexible sleeve E' with a depending tube $E^2$, the lower end of which is slightly tapered on its outer side, split, and threaded, and upon said threaded portion is a correspondingly-tapered nut $E^3$, operating when screwed up to force in the split ends of the tube that constitute jaws and cause them to grip and hold an interior tube H. A hollow shaft F is connected by a universal joint F' with the stud-shaft D and extends downward inside the tube $E^2$, being provided with a rib or spline $e$ at the lower end engaging a corresponding groove $m$ in a lower shaft M, telescoping in said shaft F. The lower end of this shaft M is supported in a head G, forming part of a tube H, which latter slides within the sleeve $E^2$ and is secured by tightening up the nut $E^3$ on the latter, clamping the tapering end thereon, this tube and head forming an adjustable support for the lower shaft independent of the upper. The lower shaft M is provided with a shoulder engaging the upper side of head G, and to its lower end is secured the flexible shaft J, to which the operating hand-tool is secured as usual, said shaft being protected by the ordinary flexible sleeve or covering J', which serves as a handle for manipulating the tool. The construction of these parts being as usual, no further illustration or description is necessary.

From the above construction it will be seen that the spring contained within the drum will keep an even tension on the belt and insure the proper operation of the pulley D, and a device embodying a movable driver-pulley operating to hold the belt taut is desirable, particularly where the driving-pulley for the belt is in the form of a cone, to enable the tool to be driven at different speeds, as is contemplated. Though I prefer the arrangement for supporting the pulley D in the form of a swinging arm, (shown,) it is obvious that instead a block sliding in ways or guides and moved in one direction by a tension-spring could be employed with good effect as far as this portion of the invention is concerned.

It will be seen that the operator can readily adjust the length of the shaft and the height of the tool by loosening the nut $E^3$ and moving the tube H up or down, the sections of the shaft telescoping, as described, when the nut may be tightened again, securing the parts in position. The universal joint in the vertical shaft and the flexible connection at the top of the shaft-supporting tubes enable the operator to swing the tool and operate in the most advantageous manner, as will be at once apparent. Of course a number of modifications in the construction of the various parts shown can be made without departing from the spirit of my invention, and I therefore do not desire to be confined to precisely the arrangement shown.

I claim as my invention—

1. The combination, with the base or support having the boss, of the arm having the pivot-stud entering the boss and the casing secured thereto, the pulley carried by the arm, and the spring connected to the boss and casing for moving the arm in one direction, substantially as described.

2. The combination, with the base or support, the arm pivoted thereto, and the spring for turning said arm, of the pulley and stud-shaft on the arm, the extensible shaft adjustably supported on the arm, and the universal connection between said two shafts, substantially as described.

3. The combination, with a pulley-support, a pulley mounted thereon, and one section of a telescoping rotary shaft connected thereto by a universal-joint connection, of another telescoping shaft-section co-operating with the first-mentioned one, and an adjustable support therefor connected to the pulley-support by a flexible connection, but independent of the first-mentioned shaft, substantially as described.

4. The combination, with a pulley-support, a pulley mounted thereon, one section of a telescoping rotary shaft connected thereto by a universal-joint connection, and a tube or sleeve inclosing said shaft and secured to the pulley-support by a flexible connection, of a second tube or sleeve telescoping with the first-mentioned one and arranged to be rigidly secured thereto, and another shaft-section supported by the said tube and telescoping with the other shaft-section, substantially as described.

5. The combination, with the movable spring-operated support, the pulley mounted thereon, and the shaft connected to the pulley by a universal-joint connection, of the telescoping shaft-casing connected to the support by a flexible connection and carrying a shaft adjustably connected with the first-mentioned one, substantially as described.

JAMES H. BEEBEE.

Witnesses:
FRED F. CHURCH,
HORACE MCGUIRE.